United States Patent
Bot et al.

(10) Patent No.: US 8,936,823 B2
(45) Date of Patent: Jan. 20, 2015

(54) FOOD PRODUCT CONTAINING ETHYLCELLULOSE

(75) Inventors: Arjen Bot, Vlaardingen (NL); Jan Alders Wieringa, Vlaardingen (NL)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 13/879,629

(22) PCT Filed: Sep. 26, 2011

(86) PCT No.: PCT/EP2011/066652
§ 371 (c)(1),
(2), (4) Date: Apr. 16, 2013

(87) PCT Pub. No.: WO2012/052253
PCT Pub. Date: Apr. 26, 2012

(65) Prior Publication Data
US 2013/0202770 A1  Aug. 8, 2013

(30) Foreign Application Priority Data
Oct. 22, 2010  (EP) .................................... 10188531

(51) Int. Cl.
| A23D 7/005 | (2006.01) |
| A23L 1/0534 | (2006.01) |
| A23L 1/01 | (2006.01) |
| A23L 1/035 | (2006.01) |
| A23L 1/30 | (2006.01) |
| A23L 1/303 | (2006.01) |

(52) U.S. Cl.
CPC .............. *A23D 7/005* (2013.01); *A23D 7/0053* (2013.01); *A23D 7/0056* (2013.01); *A23L 1/0114* (2013.01); *A23L 1/035* (2013.01); *A23L 1/0534* (2013.01); *A23L 1/3006* (2013.01); *A23L 1/303* (2013.01); *A23V 2002/00* (2013.01)
USPC .......................................... 426/602; 426/604

(58) Field of Classification Search
None
See application file for complete search history.

(56) References Cited

U.S. PATENT DOCUMENTS

| 3,245,802 | A | 4/1966 | Pardun |
| 5,332,595 | A | 7/1994 | Gaonkar |
| 5,338,563 | A | 8/1994 | Mikulka et al. |
| 8,309,154 | B2 * | 11/2012 | Cai et al. ....................... 426/564 |
| 8,597,708 | B2 * | 12/2013 | Blijdenstein et al. ......... 426/564 |
| 2008/0305221 | A1 | 12/2008 | Beltman et al. |
| 2012/0128858 | A1 | 5/2012 | Aldred et al. |
| 2012/0183663 | A1 * | 7/2012 | Marangoni ................... 426/574 |

FOREIGN PATENT DOCUMENTS

| EP | 0049705 A1 | 4/1982 |
| EP | 0653166 A1 | 5/1995 |
| EP | 1668992 A1 | 6/2006 |
| EP | WO2010121491 A1 | 10/2010 |
| WO | WO2008046669 A1 | 4/2008 |
| WO | WO2008046698 A1 | 4/2008 |
| WO | WO2008046732 A1 | 4/2008 |
| WO | WO2008046742 A1 | 4/2008 |

OTHER PUBLICATIONS

Do et al, Use of ethylcellulose polymers as stabilizer in fat-based food suspensions examined on teh example of model reduced-fat chocolate, Reactive & Functional Polymers, 2010, 856-862, vol. 70.
FrieslandCampina, "Butter That Doesn't Spatter", http://www.frieslandcampina.com/english/innovation/innovations/cheese-and-butter/butter-that-does-not-spatter.aspx.
PCT International Search Report in PCT application PCT/EP2011/066652, dated Nov. 7, 2011.
PCT International Written Opinion PCT/EP2011/066652.
PCT International Written Opinion PCT/EP2011/066652, dated Sep. 24, 2012.
International Preliminary Report on Patentability in PCT application PCT/EP2011/066652 dated Feb. 7, 2013.
EP Search Report in EP application EP 10 18 8531, dated Mar. 1, 2011.

* cited by examiner

*Primary Examiner* — Carolyn Paden
(74) *Attorney, Agent, or Firm* — Alan A. Bornstein

(57) ABSTRACT

The present invention has as an objective to provide an emulsion for shallow flying which has reduced spattering. This objective has been met by an emulsion which contains ethylcellulose particles.

15 Claims, No Drawings

FOOD PRODUCT CONTAINING ETHYLCELLULOSE

The present invention relates to a food product in the form of an emulsion, containing ethylcellulose particles. The invention also relates to a method to reduce spattering of a food product in the form of an emulsion containing ethylcellulose particles. Moreover the invention relates to the use of ethylcellulose particles as anti-spattering agent in food products in the form of an emulsion.

Fat-continuous food products, such as margarine, spreads, and liquid emulsions are well known food products. These products can be used as a medium for shallow or deep frying of food ingredients such as vegetables and meat. Nowadays also water-continuous emulsions are on the market, which are intended for shallow frying. Shallow frying is defined as a frying process in a pan, where a thin layer of emulsion is heated, water evaporates from the emulsion, and a food product such as vegetables or meat is fried in the heated oil in the pan.

A common problem that is encountered when using these products for shallow frying is spattering. This may occur when the emulsion is heated, leading to evaporation of the water and consequently volume increase of the aqueous phase. This may lead to little explosions of gas evaporating from the emulsion, resulting into spattering of oil ('primary spattering'). 'Secondary spattering' may occur when vegetables or meat or any other ingredient is being fried in hot oil (usually above 100° C.), leading to introduction of water and possibly other compounds in the hot oil. Consequently this water evaporates, and creates spattering of the oil. Primary and secondary spattering behaviours are measured by determining the spattering values SV1 and SV2 according to a protocol as specified below. When emulsions contain relatively low amount of fat, the spattering problem tends to increase, as more water evaporates which may contribute to spattering. On the other hand the amount of oil and fat in this kind of emulsions should not become too high, in order to keep the caloric value of these products as low as reasonably possible. This is important to overcome the problems of overweight and/or obesity of consumers.

Salt (sodium chloride) and lecithin (emulsifier) are common ingredients in fat continuous emulsions that reduce spattering. Salt however can be considered to be unhealthy, as the sodium ion may contribute to high blood pressure. Lecithin often originates from soya, which may be grown from a genetically modified plant. Consumers who do not wish to consume soya or soya products from GMO origin, do not like a product containing soya lecithin.

U.S. Pat. No. 3,245,802 discloses a margarine containing debittered soya bean flour to reduce spattering. U.S. Pat. No. 5,338,563 discloses a fat-continuous emulsion which comprises lecithin that is incorporated in uncrystallised fat to reduce spattering.

EP 653 166 discloses a sauce that may contain ethylcellulose, to give desired viscosity. The sauce is an emulsion that may contain butter oil.

U.S. Pat. No. 5,332,595 discloses duplex emulsions (water-in-oil-in-water and oil-in-water-in-oil). The w/o/w-emulsion contains ethylcellulose to stabilise the fat phase and therewith the emulsion is stabilised.

EP 49,705 discloses fat-continuous emulsions which may contain cellulose ethers as thickener.

EP 1 668 992 A1 discloses foamable food compositions and food foams, in which the foam is stabilised by solid inert particles, preferably silicates.

Do, T.-A. L. et al. (Reactive & Functional Polymers 70 (2010), pp. 856-862) discloses the use of ethylcellulose polymers as stabiliser of sucrose particles dispersed in vegetable fat. This is relevant in fat-based food suspensions, especially reduced fat chocolate. Ethylcellulose can be used as stabiliser for water-in-oil emulsions.

WO 2008/046732, WO 2008/046669, WO 2008/046698, and WO 2008/046742 disclose aerated food products containing fibres to stabilise air bubbles. The surface of these fibres may be modified, by attachment of ethylcellulose particles to the fibre.

WO2010/121491 A1 discloses aerated fat-continuous emulsions having an overrun of at least 1%, possibly containing ethylcellulose particles.

U.S.2008/0305221 A1 discloses emulsions containing porous powderous vegetable material as antispattering agent.

SUMMARY OF THE INVENTION

However, still the anti-spattering is not sufficient, especially secondary spattering, and therefore there is a desire that the spattering behaviour will be improved in order to prevent that the consumer will experience strong primary and/or secondary spattering. Hence it is an object of the present invention to provide a food product in the form of an emulsion that has a good spattering performance when used for shallow frying. It is another object to provide healthy emulsions for shallow frying, which have a low salt content and/or a low oil content, and nevertheless have a good spattering performance when used in shallow frying.

One or more of these objectives have now been met by an emulsion to which ethylcellulose particles have been added. These particles lead to strongly reduced spattering when the emulsion is used for shallow frying of food products.

Accordingly in a first aspect the present invention provides a food product in the form of an emulsion, containing at least 40% by weight of edible fat, and containing between 0.01% by weight and 10% by weight of ethylcellulose particles having a volume weighted mean diameter between 30 nanometer and 800 micrometer.

In a second aspect the present invention provides a method to reduce spattering of emulsions during shallow frying of food product by using an emulsion according to the first aspect of the invention.

In a third aspect the present invention provides the use of ethylcellulose particles having a volume weighted mean diameter between 30 nanometer and 800 micrometer as anti-spattering agent in food products in the form of an emulsion containing at least 40% by weight of edible fat.

DETAILED DESCRIPTION

Definitions

Unless defined otherwise, all technical and scientific terms used herein have the same meaning as commonly understood by one of ordinary skill in the art. Definitions and descriptions of various terms and techniques used in fat-based food systems are given in Bailey's Industrial Oil and Fat Products, $6^{th}$ Edition, Shahidi and Fereidoon (eds.), vol. 1-6, 2005, John Wiley & Sons.

All percentages, unless otherwise stated, refer to the percentage by weight, with the exception of percentages cited in relation to the overrun. The term 'wt %' relates to percentage by weight of the total composition, unless stated otherwise.

In the context of the present invention, the average particle diameter is expressed as the $d_{4,3}$ value, which is the volume weighted mean diameter, unless stated otherwise. The volume based particle size equals the diameter of a sphere that has same the same volume as a given particle.

The ranges that are indicated include the endpoints, unless stated otherwise, and are understood by the skilled person to be values which may vary within limits which are acceptable to the skilled person. These variations within certain limits may for instance be determined by measurement uncertainties.

The term 'aerated' means that gas has been intentionally incorporated into a product, for example by mechanical means. The gas can be any gas, but is preferably, in the context of food products, a food-grade gas such as air, nitrogen, nitrous oxide, or carbon dioxide. The extent of aeration is measured in terms of 'overrun', which is defined as the following ratio:

[weight of unaerated mix−weight of aerated product]/
[weight of aerated product]×100%.

Here the weights refer to a fixed volume of aerated product and unaerated mix (from which the aerated product is made). Overrun is measured at atmospheric pressure.

Butter, margarine, water-in-oil emulsion spreads or water-in-oil emulsion liquid margarines may hereinafter collectively be referred to as water-in-oil emulsion food products, or oil-continuous emulsion food products. Oil-in-water emulsions in liquid or structured form may collectively be referred to as oil-in-water emulsion food products, or water-continuous emulsion food products. Together they may be referred to as emulsions or food products in the form of an emulsion.

A water-in-oil or oil-in-water emulsion food product is herein understood to contain more than 0.1 wt %, preferably more than 1 wt %, more preferably more than 5 wt % of a water phase. A water-in-oil emulsion food product preferably comprises 15 wt % or more and most preferably 25 wt % or more water phase.

The emulsion may comprise any conventional ingredients in the oil phase and in the water phase. The emulsion food product may be any conventional format, and includes products that are packed in a wrapper, products that are suitable for packing in a tub and liquid products that may be packaged in a (squeezable) bottle.

In case the food product is a liquid water-in-oil emulsion designed for shallow frying, the oil phase of the water-in-oil emulsion food products optionally comprises an emulsion structuring component which imparts stability to the final product. Hydrogenated high erucic rapeseed oil is a well known most preferred emulsion structuring component which keeps powder particles and aqueous phase droplets stably dispersed. Other suitable emulsion structuring components comprise hydrogenated fish oil, hydrogenated ground nut oil, hydrogenated sunflower oil and mixtures thereof. The amount of emulsion structuring component suitably is between 0.15 wt % and 2 wt %. The products may also contain fractionated and (chemically or enzymatically) interesterified fats.

Optionally, a food product in the form of a water-in-oil emulsion comprises other ingredients such as lecithin or another emulsifying substance, colouring agent, flavour components or salt (NaCl). Lecithin and salt are common antispattering agents. In the present invention they are redundant, but nevertheless they may be present for other reasons, the lecithin for its desired browning and foaming effect and the salt for imparting taste. The concentration of salt, of present, is preferably less than 1.5 wt % salt, more preferably less than 1.0 wt %, even more preferably less than 0.5 wt %. Preferably the emulsion resulting from the present invention is substantially free from cooking salt. The emulsion may also contain potassium chloride in addition to or instead of sodium choride.

Optionally a food product in the form of an oil-in-water emulsion comprises thickeners in the form of a protein like gelatin, or polysaccharides such as xanthan gum or guar gum, or other suitable thickeners. Also a water-in-oil emulsion may comprise such thickeners.

The food products may be all kinds of food products, for instance marinades, sauces, seasonings, batter, spray products, spreads, liquid shallow frying products and/or seasonings.

Preferably, food products according to the invention are spreads (water-in-oil emulsions or oil-in-water emulsions), margarines (water-in-oil emulsions), dairy products such as butter (water-in-oil emulsion), or liquid water-in-oil emulsions or liquid oil-in-water emulsions designed for shallow frying. For example margarines and water-in-oil emulsions may be prepared by using a votator process.

As used herein the term "oil" is used as a generic term for lipids and fats either pure or containing compounds in solution. Oils can also contain particles in suspension.

As used herein the term "lipids" is used as a generic term for long chain fatty acids or long chain alcohols wherein the term "long chain" is used as a generic term for 12 carbon atoms or more.

As used herein the term "fats" is used as a generic term for compounds containing more than 80% triglycerides. They can also contain diglycerides, monoglycerides and free fatty acids. In common language, liquid fats are often referred to as oils but herein the term fats is also used as a generic term for such liquid fats. Fats include: plant oils (for example: apricot kernel oil, arachis oil, arnica oil, argan oil, avocado oil, babassu oil, baobab oil, black seed oil, blackberry seed oil, blackcurrant seed oil, blueberry seed oil, borage oil, calendula oil, camelina oil, camellia seed oil, castor oil, cherry kernel oil, cocoa butter, coconut oil, corn oil, cottonseed oil, evening primrose oil, grapefruit oil, grapeseed oil, hazelnut oil, hempseed oil, jojoba oil, lemon seed oil, lime seed oil, linseed oil, kukui nut oil, macadamia oil, maize oil, mango butter, meadowfoam oil, melon seed oil, moringa oil, olive oil, orange seed oil, palm oil, palm kernel oil, papaya seed oil, passion seed oil, peach kernel oil, plum oil, pomegranate seed oil, poppy seed oil, pumpkins seed oil, rapeseed (or canola) oil, red raspberry seed oil, rice bran oil, rosehip oil, safflower oil, seabuckthorn oil, sesame oil, soyabean oil, strawberry seed oil, sunflower oil, sweet almond oil, walnut oil, wheat germ oil); fish oils (for example: sardine oil, mackerel oil, herring oil, cod-liver oil, oyster oil); animal oils (for example: butter or conjugated linoleic acid); or any mixture or fraction thereof. The fats may also have been hardened or chemically or enzymatically interesterified.

Ethylcellulose

Products according to the present invention contain ethylcellulose particles. The general structural formula of ethylcellulose is:

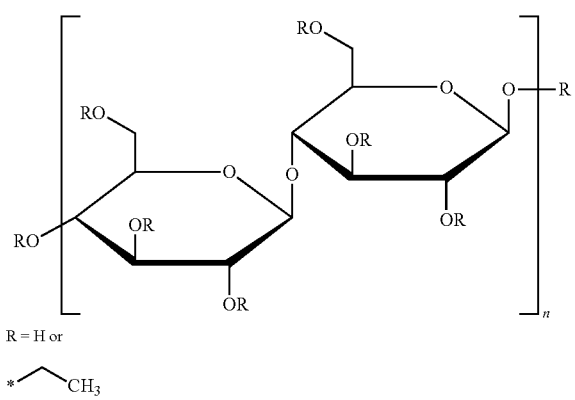

R = H or

*∕∖CH₃

The degree of substitution of the ethylcellulose used in the present invention is preferably between 2 and 3, more preferably about 2.5. The average number of hydroxyl groups substituted per anhydroglucose unit (the 'monomer') is known as the 'degree of substitution' (DS). If all three hydroxyls are replaced, the maximum theoretical DS of 3 results.

Suitable sources and types of the ethylcellulose used in the present invention are supplied by for example Hercules, Aldrich, and Dow Chemicals. Suitable ethylcellulose preferably has a viscosity between 5 and 300 mPa·s at a concentration of 5% in toluene/ethanol 80:20, more preferably between 100 and 300 mPa·s at these conditions.

Food Products in the Form of an Emulsion

In a first aspect the present invention provides a food product in the form of an emulsion, containing at least 40% by weight of edible fat, and containing between 0.01% by weight and 10% by weight of ethylcellulose particles having a volume weighted mean diameter between 30 nanometer and 800 micrometer.

The emulsions resulting from the invention shows such improved spattering behaviour when used in shallow frying, that its SV1 value is at least 8 and its SV2 value at least 6, preferably SV1 is at least 9 and SV2 at least 8, more preferably SV1 is at least 9 and SV2 at least 9.

The emulsion according to the invention may be aerated, or may be free from gas bubbles. A tiny amount of gas bubbles may be present in the product due to the production process, or it may be intentionally aerated during the production process. Aeration may take place by any suitable method. Nevertheless, preferably the food product according to the invention has an overrun which is lower than 20%. More preferred the overrun is lower than 15%, preferably lower than 10%. Even more preferred the overrun is lower than 5%, or even lower than 2%. Most preferred the overrun is lower than 1%, preferably lower than 0.5, or even lower than 0.1%. Most preferred the food product is substantially free from gas bubbles, or preferably free from gas bubbles.

The ethylcellulose particles are functional across a wide range of sizes, the volume weighted mean diameter of the particles is between 30 nanometer and 800 micrometer. The smaller particles are more effective in reduction of the spattering as compared to larger particles, when compared on a total concentration of ethylcellulose basis (weight/weight). Therefore preferably the ethylcellulose particles have a volume weighted mean diameter between 30 nanometer and 10 micrometer, more preferably between 30 nanometer and 5 micrometer. More preferred the volume weighted mean diameter is between 40 nanometer and 1 micrometer, more preferred between 50 nanometer and 800 nanometer. Most preferred the volume weighted mean diameter is between 50 nanometer and 500 nanometer. Another benefit of these small particle size ranges is that the consumer does not observe the particles.

On the other hand the emulsion may contain particles of a larger size. Also in that case the ethylcellulose particles are functional to reduce the spattering. Hence in another embodiment the ethylcellulose particles preferably have a volume weighted mean diameter between 2 micrometer and 800 micrometer, more preferred between 5 micrometer and 500 micrometer.

In another embodiment the food product may contain ethylcellulose particles with average sizes within both identified ranges, hence containing particles having a volume weighted mean diameter between 30 nanometer and 10 micrometer, and containing particles having a volume weighted mean diameter between 50 micrometer and 800 micrometer.

The concentration of ethylcellulose particles in the food product according to the invention is between 0.01% by weight and 10% by weight, preferably between 0.01% by weight and 5% by weight, more preferably between 0.1% by weight and 1% by weight. Even more preferred the ethylcellulose concentration may be lower than 0.2% by weight.

In case the volume weighted mean diameter of the ethylcellulose particles is between 30 nanometer and 10 micrometer, then the concentration of ethylcellulose particles is preferably between 0.01% by weight and 1% by weight, more preferred between 0.01% by weight and 0.5% by weight, more preferred between 0.01% by weight and 0.25% by weight, more preferred between 0.01% by weight and 0.2% by weight, more preferred between 0.05% by weight and 0.2% by weight, more preferred between 0.1% by weight and 0.2% by weight.

Preferably, the ethylcellulose particles have a volume weighted mean diameter between 50 nanometer and 500 nanometer, and the food product according to the invention has a concentration of ethylcellulose particles between 0.01% by weight and 0.2% by weight.

In case the volume weighted mean diameter of the ethylcellulose particles is between 50 micrometer and 800 micrometer, then the concentration of ethylcellulose particles is preferably between 0.1% by weight and 10% by weight, more preferred between 0.2% by weight and 2% by weight, more preferred between 0.2% by weight and 1% by weight, more preferred between 0.25% by weight and 1% by weight, more preferred between 0.5% by weight and 1% by weight.

Preferably, the ethylcellulose particles have a volume weighted mean diameter between 5 micrometer and 500 micrometer, and the food product according to the invention has a concentration of ethylcellulose particles between 0.5% by weight and 1% by weight.

In a preferred embodiment, the emulsion according to the invention is an oil-in-water emulsion. Then preferably the food product contains preferably at least 50% by weight of edible fat, more preferred at least 60% by weight.

In case the emulsion according to the invention is an oil-in-water emulsion, and in case the volume weighted mean diameter of the ethylcellulose particles is between 30 nanometer and 10 micrometer, then the concentration of ethylcellulose particles is preferably between 0.01% by weight and 1% by weight, more preferred between 0.01% by weight and 0.5% by weight, more preferred between 0.01% by weight and 0.25% by weight, more preferred between 0.01% by weight and 0.2% by weight.

In case the emulsion according to the invention is an oil-in-water emulsion, and in case the volume weighted mean diameter of the ethylcellulose particles is between 50 micrometer and 800 micrometer, then the concentration of ethylcellulose particles is preferably between 0.1% by weight and 10% by weight, more preferred between 0.2% by weight and 2% by weight, more preferred between 0.2% by weight and 1% by weight, more preferred between 0.25% by weight and 1% by weight, more preferred between 0.5% by weight and 1% by weight.

In another preferred embodiment, the emulsion according to the invention is a water-in-oil emulsion. Then preferably the food product contains preferably at least 60% by weight of edible fat, preferably at least 75% by weight of edible fat.

In case the emulsion according to the invention is a water-in-oil emulsion, and in case the volume weighted mean diameter of the ethylcellulose particles is between 30 nanometer and 10 micrometer, then the concentration of ethylcellulose particles is preferably between 0.01% by weight and 1% by weight, more preferred between 0.01% by weight and 0.5% by weight, more preferred between 0.05% by weight and 0.3% by weight, more preferred between 0.1% by weight and 0.3% by weight, more preferred between 0.1% by weight and 0.2% by weight.

In case the emulsion according to the invention is a water-in-oil emulsion, and in case the volume weighted mean diameter of the ethylcellulose particles is between 50 micrometer and 800 micrometer, then the concentration of ethylcellulose particles is preferably between 0.1% by weight and 10% by weight, more preferred between 0.1% by weight and 2% by weight, more preferred between 0.25% by weight and 1% by weight, more preferred between 0.5% by weight and 1% by weight.

Preferably an emulsion according to the invention contains at most 95% by weight of edible fat.

Method to Reduce Spattering

In a second aspect the present invention provides a method to reduce spattering of emulsions during shallow frying of food product by using an emulsion according to the first aspect of the invention. The present invention is related particularly to a method for improving both primary and secondary spattering behaviour.

Any preferred aspect of the first embodiment of the invention may be a preferred aspect in the context of the second aspect of the invention, mutatis mutandis.

Use of Ethylcellulose Particles

In a third aspect the present invention provides the use of ethylcellulose particles having a volume weighted mean diameter between 30 nanometer and 800 micrometer as anti-spattering agent in food products in the form of an emulsion containing at least 40% by weight of edible fat. This use is particularly relevant when the food product is used in shallow frying of food ingredients such as meat or vegetables.

Any preferred aspect of the first embodiment of the invention may be a preferred aspect in the context of the third aspect of the invention, mutatis mutandis.

Various modifications and variations of the described methods and products of the invention will be apparent to those skilled in the art without departing from the scope of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in the relevant fields are intended to be within the scope of the following claims.

EXAMPLES

The following non-limiting examples illustrate the present invention.

Primary and Secondary Spattering Tests

Determination of Spattering Values in a Spattering Test

Primary spattering (SV1) is assessed under standardised conditions in which an aliquot of a food product is heated in a glass dish and the amount of fat spattered onto a sheet of paper held above the dish is assessed after the water content of the food product has been evaporated by heating.

Secondary spattering (SV2) is assessed under standardised conditions in which the amount of fat spattered onto a sheet of paper held above the dish is assessed after injection of a quantity of 10 milliliter water into the dish.

In assessment of both primary and secondary spattering values, 25 gram food product is heated in a 15 cm diameter glass bowl on an electric plate to about 205° C. The oil or fat that spatters out by force of expanding evaporating water droplets is caught on a sheet of paper situated at 25 cm above the pan (SV1 test). Subsequently a quantity of 10 milliliter water is poured into the bowl and again the fat that spatters out of the glass bowl by force of expanding evaporating water droplets is caught on a sheet of paper situated above the pan (SV2 test).

The images on the paper sheets as obtained are compared with a set of standard pictures, numbered 0-10, whereby the number of the best resembling picture is recorded as the spattering value. 10 indicates no spattering and 0 indicates very high spattering. The standard scoring method is as indicated in table 1.

TABLE 1

Standard scoring table for spattering values SV1 and SV2

| Score | Comments |
|---|---|
| 10 | Excellent |
| 8 | Good |
| 6 | Passable |
| 4 | Unsatisfactory for SV1, almost passable for SV2 |
| 2 | Very poor |

Typical results for household margarines (~80 wt % fat) are 8.5 for primary spattering (SV1) and 4.6 for secondary spattering (SV2) under the conditions of the above mentioned test.

All tests are done in duplicate, yielding two measurement values, which are averaged to yield one result.

Example 1

Preparation of Ethylcellulose Colloidal Particles in Dispersion Materials

Aqualon® Ethylcellulose (type N 100) in powdered form was purchased from Hercules (Widnes, UK) and used as received. Ethoxyl content was 48.0-49.5%, and degree of substitution was 2.46-2.57. Viscosity was 80-105 mPa·s (at 5% and 25° C. in 80/20 toluene/ethanol). Particle size is between about 100 and 500 micrometer. Acetone (analytical grade) and tartaric acid were obtained from Sigma-Aldrich Chemicals (Schnelldorf, Germany) and used without further purification. Deionised water was obtained from a Millipore filter system.

Particle Sizing/Electrophoresis

Dynamic light scattering measurements were carried out using a Zetasizer Nano ZS instrument (Malvern Instruments, Malvern, UK) to determine the average particle diameter. Samples were measured without any dilution at 25° C. The viscosity of water was assumed in all cases and a refractive index of 1.59 was used in the analysis. The results from the measurements are the z-average particle size and the standard deviation of the z-average particle size (which relates to the peak width of a distribution curve of the particle size). For monodisperse systems with a narrow distribution, which is the case for ethylcellulose particles of the present invention, the difference between the z-average particle diameter and volume weighted mean diameter ($d_{4,3}$) is smaller than 10%. In the present case the z-average diameter is about 10% larger than $d_{4,3}$.

Preparation of Colloidal Ethylcellulose Particles.

1. 1 gram ethylcellulose powder was dissolved in 100 milliliter acetone (purity>98%) at 35° C. in a 500 milliliter beaker until completely dissolved.
2. An equal volume of distilled water (at room temperature, about 22° C.) was quickly added into the ethylcellulose solution under strong stirring to precipitate the ethylcellulose into particles.
3. The solution was left to stir for another 10 minutes after which the acetone and some of the water were evaporated under low pressure in a rotary evaporator, until a final concentration of ethylcellulose in water of 2% was obtained.
4. Tartaric acid was added to reach a pH of 3.
5. The z-average diameter of the ethylcellulose particles was determined to be 130 nanometer, with a standard deviation of the z-average diameter of 19.5 nanometer.

Example 2

Oil-Continuous Emulsions Containing Ethylcellulose Particles

Commercially available Blue Band liquid margarine (ex Unilever, Rotterdam, The Netherlands) was used to determine the antispattering effect of ethylcellulose particles. This margarine is a water-in-oil emulsion, which is regularly used for shallow frying.

Ingredients of this Blue Band liquid margarine are (in weight % of the total composition): total vegetable oils and fats 82% (saturated ~8%, monounsaturated ~49%, polyunsaturated ~24%), water, salt (NaCl) 1.5%, emulsifier (soy lecithin), flavours, citric acid, colourant (beta-carotene), vitamins A and D.

Ethylcellulose particles (both N 100 as received, as well as in 2 wt % colloidal dispersion as obtained in example 1) were manually dispersed in this emulsion, at various concentrations. The primary and secondary spattering values as determined are indicated in the following table.

TABLE 2

Concentration of ethylcellulose particles and obtained primary and secondary spattering values (SV1, SV2), in oil-continuous (water-in-oil) emulsion with 82 wt % fat.

| | SV1 ($1^{st}$) | SV1 ($2^{nd}$) | SV1 average | SV2 ($1^{st}$) | SV2 ($2^{nd}$) | SV2 average |
|---|---|---|---|---|---|---|
| concentration ethylcellulose (as received) [wt %] | | | | | | |
| 0 (comparative) | 9.5 | 9 | 9.25 | 6.5 | 7 | 6.75 |
| 0.01 | 8.5 | 9 | 8.75 | 6 | 6.5 | 6.25 |
| 0.1 | 9 | 9.5 | 9.25 | 6 | 6 | 6 |
| 0.25 | 9 | 9.5 | 9.25 | 6 | 6.5 | 6.25 |
| 0.5 | 9.5 | 9.5 | 9.5 | 7 | 8 | 7.5 |
| 1 | 9.5 | 9 | 9.25 | 7.5 | 8.5 | 8 |
| concentration ethylcellulose colloidal dispersion [wt %] * | | | | | | |
| 0.01 | 9 | 9.5 | 9.25 | 6.5 | 7 | 6.75 |
| 0.1 | 9 | 9.5 | 9.25 | 6.5 | 7 | 6.75 |

* the colloidal ethylcellulose particles are added as a 2% dispersion in water (as obtained from example 1), the concentration as indicated here is the ethylcellulose concentration in the emulsion as such Similar experiments were done with commercially available Becel light spread (ex Unilever, Rotterdam, The Netherlands). This spread is a water-in-oil emulsion, which is meant for spreading, and is not specifically designed for shallow frying. This spread has a lower fat content than the liquid 82% fat emulsion, namely 35%.

Ingredients of the Becel light spread are (in weight % of the total composition): water, total vegetable oils and fats 35% (saturated ~7%, monounsaturated ~9.5%, polyunsaturated ~17.5%), gelatine, emulsifiers (lecithin, monoglyceride), preservative potassium sorbate, citric acid, vitamins A, B6, B11, B12, D, E), flavours, colourant (beta-carotene).

The experiments were only done with the ethylcellulose particles as received. These particles were manually mixed into the spread. Results are given in the following table.

TABLE 3

Concentration of ethylcellulose particles and obtained primary and secondary spattering values (SV1, SV2), in oil-continuous (water-in-oil) emulsion with 35 wt % fat.

| concentration ethylcellulose (as received) [wt %] | SV1 ($1^{st}$) | SV1 ($2^{nd}$) | SV1 average | SV2 ($1^{st}$) | SV2 ($2^{nd}$) | SV2 average |
|---|---|---|---|---|---|---|
| 0 (comparative) | 5 | 6 | 5.5 | 6.5 | 6 | 6.25 |
| 1 | 8 | 8 | 8 | 7 | 7.5 | 7.25 |

The results show:
in 82% fat water-in-oil emulsion:
  ethylcellulose particles as received increase the SV2 value, with increasing concentration of ethylcellulose. The SV1 value remains high, and is already high without ethylcellulose.
  with colloidal ethylcellulose particles the SV1 and SV2 values remain the same as the reference (without ethylcellulose).
in 35% fat water-in-oil emulsion:
  the reference (without ethylcellulose) SV1 value is rather low, as this spread was not designed for frying. Nevertheless the addition of ethylcellulose particles as received increase the SV1 value. Also the SV2 value improves.

Example 3

Water-Continuous Emulsions Containing Ethylcellulose Particles

Commercially available Becel keuken light liquid emulsion (ex Unilever, Rotterdam, The Netherlands) was used to determine the antispattering effect of ethylcellulose particles. This is an oil-in-water emulsion, which is regularly used for shallow frying.

Ingredients of this Becel light liquid emulsion are (in weight % of the total composition): total vegetable oils and fats 56% (saturated ~6%, monounsaturated ~21%, polyunsaturated ~29%), water, salt (KCl) %, emulsifier (soy lecithin), thickeners (guar xanthan gum, guar gum), citric acid, potassium citrate, preservative (potassium sorbate), flavours, vitamins A, D and E, colourant (beta-carotene).

Ethylcellulose particles (both as received, as well as in 2 wt % colloidal dispersion as obtained in example 1) were manually dispersed in this emulsion, at various concentrations. The primary and secondary spattering values as determined are indicated in the following table.

TABLE 4

Concentration of ethylcellulose particles and obtained primary and secondary spattering values (SV1, SV2), in water-continuous (oil-in-water) emulsion with 56 wt % fat.

| | SV1 ($1^{st}$) | SV1 ($2^{nd}$) | SV1 average | SV2 ($1^{st}$) | SV2 ($2^{nd}$) | SV2 average |
|---|---|---|---|---|---|---|
| concentration ethylcellulose (as received) [wt %] | | | | | | |
| 0 (comparative) | 7.5 | 8 | 7.75 | 8 | 8 | 8 |
| 0.01 | 7 | 7.5 | 7.25 | 8 | 8 | 8 |
| 0.1 | 7.5 | 8 | 7.75 | 7 | 7.5 | 7.25 |
| 0.25 | 8 | 7.5 | 7.75 | 8.5 | 8 | 8.25 |
| 0.5 | 8 | 8.5 | 8.25 | 8.5 | 9 | 8.75 |
| 1 | 9 | 9.5 | 9.25 | 9 | 10 | 9.5 |
| concentration ethylcellulose colloidal dispersion [wt %] * | | | | | | |
| 0.01 | 8 | 8.5 | 8.25 | 8 | 8.5 | 8.25 |
| 0.1 | 8.5 | 8.5 | 8.5 | 8 | 8.5 | 8.25 |

* the colloidal ethylcellulose particles are added as a 2% dispersion in water (as obtained from example 1), the concentration as indicated here is the ethylcellulose concentration in the emulsion as such Similar experiments were done with the same Becel liquid emulsion, which has been diluted with water to decrease the fat level to 19.6 wt % (35 wt % Becel liquid emulsion and 65 wt % water).

These experiments were only done with the ethylcellulose particles as received. These particles were manually mixed into the spread. Results are given in the following table.

TABLE 5

Concentration of ethylcellulose particles and obtained primary and secondary spattering values (SV1, SV2), in water-continuous (oil-in-water) emulsion with 19.6 wt % fat.

| concentration ethylcellulose (as received) [wt %] | SV1 ($1^{st}$) | SV1 ($2^{nd}$) | SV1 average | SV2 ($1^{st}$) | SV2 ($2^{nd}$) | SV2 average |
|---|---|---|---|---|---|---|
| 0 (comparative) | 9 | 8.5 | 8.75 | 8 | 8.5 | 8.25 |
| 1 | 9.5 | 9.5 | 9.5 | 9.5 | 9.5 | 9.5 |

The results show:

in 56% fat oil-in-water emulsion:
ethylcellulose particles as received increase both the SV1 and SV2 values, with increasing concentration of ethylcellulose.
with colloidal ethylcellulose particles the SV1 and SV2 values also increase compared to the reference (without ethylcellulose).

in 19.6% fat oil-in-water emulsion:
The addition of ethylcellulose particles as received increases the SV1 and the SV2 values.

Overall is shown that in four emulsions with four different fat levels (ranging from 19.6% to 82%) the primary and secondary spattering values increase when the emulsions contain ethylcellulose particles.

In the water-continuous emulsions both the SV1 and SV2 values increase, leading to an overall improvement of antispattering behaviour. In the oil-continuous emulsions with 82% oil the reference SV1 value is already high, while the SV2 value strongly increases.

In a few tests as described above in tables 2 and 4, emulsions can be compared which have been tested with the ethylcellulose particles as received, as well as with the colloidal ethylcellulose particles (same emulsion, and same concentration of ethycellulose). These emulsions have been listed in the following table, and the measured SV1 and SV2 values have been listed.

TABLE 6

Comparison of SV1 and SV2 values between ethylcellulose particles as received and colloidal ethylcellulose particles.

| concentration ethylcellulose in emulsion [wt %] | emulsion fat level [wt %] | oil- or water-continuous | measured spattering value | SV1 or SV2 (average) value for ethylcellulose as received | SV1 or SV2 (average) value for colloidal ethylcellulose particles |
|---|---|---|---|---|---|
| 0.01% | 82 | oil-cont. | SV1 | 8.75 | 9.25 |
| 0.1% | 82 | oil-cont. | SV1 | 9.25 | 9.25 |
| 0.01% | 82 | oil-cont. | SV2 | 6.25 | 6.75 |
| 0.1% | 82 | oil-cont. | SV2 | 6 | 6.75 |
| 0.01% | 56 | water-cont. | SV1 | 7.25 | 8.25 |
| 0.1% | 56 | water-cont. | SV1 | 7.75 | 8.5 |
| 0.01% | 56 | water-cont. | SV2 | 8 | 8.25 |
| 0.1% | 56 | water-cont. | SV2 | 7.25 | 8.25 |

This table shows that the measured SV1 and SV2 values for the emulsions with colloidal EC particles are higher than the corresponding values for the emulsions with ethylcellulose as received.

The invention claimed is:

1. A food product in the form of an emulsion, containing at least 40% by weight of edible fat,
and containing between 0.01% by weight and 10% by weight of ethylcellulose particles having a volume weighted mean diameter $d_{4,3}$ between 30 nanometer and 800 micrometer, whereby in case the volume weighted mean diameter of the ethylcellulose particles is between 50 micrometer and 800 micrometer, the concentration of ethylcellulose particles is between 0.25% by weight and 10% by weight.

2. A food product according to claim 1, having an overrun that is lower than 20%.

3. A food product according to claim 2, wherein the overrun is lower than 1%.

4. A food product according to claim 1, wherein the ethylcellulose particles have a volume weighted mean diameter between 50 nanometer and 500 nanometer.

5. A food product according to claim 4, wherein the concentration of ethylcellulose particles is between 0.01% by weight and 0.2% by weight.

6. A food product according to claim 1, wherein the ethylcellulose particles have a volume weighted mean diameter between 5 micrometer and 500 micrometer.

7. A food product according to claim 6, wherein the concentration of ethylcellulose particles is between 0.5% by weight and 1% by weight.

8. A food product according to claim 1, wherein the concentration of ethylcellulose particles is between 0.01% by weight and 1% by weight.

9. A food product according to claim 1, wherein the food product is an oil-in-water emulsion.

10. A food product according to claim 9, wherein the food product contains at least 50% by weight of edible fat.

11. A food product according to claim 1, wherein the food product is a water-in-oil emulsion.

12. A food product according to claim 11, wherein the food product contains at least 60% by weight of edible fat.

13. A food product according to claim 1, wherein the food product contains at most 95% by weight of edible fat.

14. A method to reduce spattering of emulsions during shallow frying of food product by using an emulsion according to claim 1.

15. A method to reduce spattering when frying a food product comprising the step of adding ethylcellulose particles having a volume weighted mean diameter between 30 nanometer and 800 micrometer as an anti-spattering agent to the food products in the form of an emulsion containing at least 40% by weight of edible fat.

* * * * *